United States Patent
Van Voorhis et al.

(10) Patent No.: US 11,452,401 B2
(45) Date of Patent: Sep. 27, 2022

(54) BEVERAGE BREWING AND DISPENSER APPARATUS

(71) Applicant: Service Ideas, Inc., Woodbury, MN (US)

(72) Inventors: Benjamin A. Van Voorhis, St. Paul, MN (US); Thomas A. Wendt, Colfax, WI (US); Joseph J. Krawczyk, Hugo, MN (US); Michael J. Store, Savage, MN (US)

(73) Assignee: Service Ideas, Inc., Woodbury, MN (US)

( * ) Notice: Subject to any disclaimer, the term of this patent is extended or adjusted under 35 U.S.C. 154(b) by 548 days.

(21) Appl. No.: 15/916,033

(22) Filed: Mar. 8, 2018

(65) Prior Publication Data

US 2018/0255958 A1 Sep. 13, 2018

Related U.S. Application Data

(60) Provisional application No. 62/468,849, filed on Mar. 8, 2017.

(51) Int. Cl.
*A47J 31/20* (2006.01)
*A47J 31/06* (2006.01)
*A47J 31/00* (2006.01)

(52) U.S. Cl.
CPC ............. *A47J 31/20* (2013.01); *A47J 31/007* (2013.01); *A47J 31/0636* (2013.01)

(58) Field of Classification Search
CPC .... A47J 31/06; A47J 31/0626; A47J 31/0636; A47J 31/0642; A47J 36/06; B65F 1/1615; B60K 15/0406; B65D 51/242; B65D 2543/00092; B65D 85/808; B65D 85/8046; B65D 85/8061; B65D 85/8052; B65D 47/0847; B65D 11/14; B65D 3/26; A47G 19/16
USPC ...................................... 220/212.5
See application file for complete search history.

(56) References Cited

U.S. PATENT DOCUMENTS

| | | | | |
|---|---|---|---|---|
| 1,168,092 | A * | 1/1916 | Mauntel | B65D 35/42 220/811 |
| 3,041,960 | A * | 7/1962 | Hall | A47J 31/06 99/316 |
| 8,079,301 | B2 * | 12/2011 | Birch | A47J 31/20 99/317 |
| 2016/0309944 | A1 * | 10/2016 | Masifilo | A23F 3/34 |

FOREIGN PATENT DOCUMENTS

| | | | |
|---|---|---|---|
| GB | 190008466 | * | 5/1900 |
| JP | 203369689 | * | 1/2014 |

OTHER PUBLICATIONS

Custom Wire Baskets (https://www.marlinwire.com/blog/the-utility-of-custom-wire-baskets-with-lids) (Year: 2014).*

* cited by examiner

*Primary Examiner* — Erik Kashnikow
*Assistant Examiner* — Lela S. Williams
(74) *Attorney, Agent, or Firm* — Skaar Ulbrich Macari, P.A.

(57) ABSTRACT

A method and apparatus for simultaneous brewing and beverage dispensing, in which a brew basket is positionable in a beverage dispenser to permit brewing. The brew basket includes a novel shape that permits it to take advantage of current beverage dispenser configurations to ease the brewing process.

18 Claims, 14 Drawing Sheets

BEVERAGE BREWING AND DISPENSER APPARATUS

PRIORITY

This application claims the benefit of U.S. Provisional Patent Application No. 62/468,849, filed on Mar. 8, 2017.

FIELD

The present invention relates generally to the field of beverage dispensers, and more specifically to a beverage dispenser having a brewing system that brews within a beverage dispenser and is also usable with other conventional beverage dispensers.

BACKGROUND

In the past there have been a wide variety of different types of beverage dispensing apparatuses. In the catering or buffet business, for instance, large beverage dispensers generally include a container having a lid for protecting a beverage contained therein and a spout for dispensing the beverage into a glass or cup. These large beverage dispensers are typically designed to hold and dispense a beverage with the brewing process being conducted in another separate container. The use of another container for brewing results in the additional steps of brewing or infusing the beverage and then transferring (e.g. via pouring) the brewed or infused beverage into the dispensing container.

The additional steps required for brewing or infusing beverages used in conventional beverage dispensers requires a catering business, restaurant, or hotel to have multiple pieces of equipment. For instance, they will typically need a separate brewing container, system, or apparatus to store the beverage while it is being brewed or infused. These brewing containers also generally need a separate basket or infuser that sits in the brewing container where the brewing process is occurring. If the brewing container is not also used for transferring the brewed or infused beverage to a dispensing container, a separate carrier such as a pitcher will be needed. The additional equipment that is currently needed to brew or infuse a beverage takes up valuable space in kitchens and catering vehicles. The additional equipment must also be regularly cleaned, which results in additional utility and labor expenses. Moreover, the transferring process creates opportunities for spills and contamination of the beverage.

As a result, there is a need for a new and improved apparatus that can be utilized in preparing different types of beverages in a beverage dispensing container. There is also a need for an apparatus that is interchangeable or connectable with current beverage dispensers such that current beverage dispensers can be updated to have the advantages of the present invention.

SUMMARY

The invention set forth in this specification pertains to a new and improved apparatus for use in preparing, infusing and dispensing beverages. The present apparatus is generally intended for use in preparing different forms of beverages such as tea, coffee, fruit, spices, and the like made from infusible materials. However, it will be realized that an apparatus, method, and system as set forth herein can also be utilized for other purposes.

It is an object of the invention to provide a brewing or infusing apparatus that includes a beverage dispenser and a brewing or infusing assembly that fits into a beverage dispenser. It is a further object of the invention to have a brewing or infusing apparatus that is designed to permit the brewing to occur directly in a beverage dispenser.

The brewing or infusing apparatus of the present invention may include a beverage dispenser having an interior capable of receiving a brewing assembly that may include a brew basket that is designed to hold a material used in the brewing process. The brew basket can be removably connected to a suspension assembly that suspends the brew basket in the beverage dispenser so that brewing and beverage dispensing may occur simultaneously.

The brew basket may include handles pivotally coupled to the brew basket to aid in placing into and removing the brew basket from the beverage dispenser. The handles may include a feature to selectively lock a cover onto the brew basket. The handles may be removable from the brew basket to aid in its storage and cleaning.

The detailed technology and preferred embodiments implemented for the subject invention are described in the following paragraphs accompanying the appended drawings for people skilled in this field to well appreciate the features of the claimed invention. It is understood that the features mentioned hereinbefore and those to be commented on hereinafter may be used not only in the specified combinations, but also in other combinations or in isolation, without departing from the scope of the present invention.

BRIEF DESCRIPTION OF THE DRAWINGS

These and other features of the invention will become more apparent from the following description in which reference is made to the appended drawings, wherein.

While the invention is amenable to various modifications and alternative forms, specifics thereof have been shown by way of example in the drawings and will be described in detail. It should be understood, however, that the intention is not to limit the invention to the particular example embodiments described. On the contrary, the invention is to cover all modifications, equivalents, and alternatives falling within the spirit and scope of the invention as defined by the appended claims.

DETAILED DESCRIPTION

In the following descriptions, the present invention will be explained with reference to example embodiments thereof. However, these embodiments are not intended to limit the present invention to any specific example, embodiment, environment, applications, or implementations described in these embodiments. Therefore, description of these embodiments is only for purpose of illustration rather than to limit the present invention. It should be appreciated that, in the following embodiments and the attached drawings, elements unrelated to the present invention are omitted from depiction; and dimensional relationships among individual elements in the attached drawings are illustrated only for ease of understanding, but not to limit the actual scale.

Referring generally to FIGS. 1-16, a brewing or infusing apparatus 10 that is designed to permit the brewing of liquid beverages, such as tea, coffee, fruit drinks, and the like, directly in a beverage dispenser 12. The apparatus is particularly adapted to so-called cold brewing of beverages. Cold brewing is where the brewing material (e.g. coffee or tea) is brewed with room temperature or cold water over a long time period such as 12 to 24-hours. However, the present apparatus can be used to brew beverages using any temperature of water or any other liquid.

Figure 1:
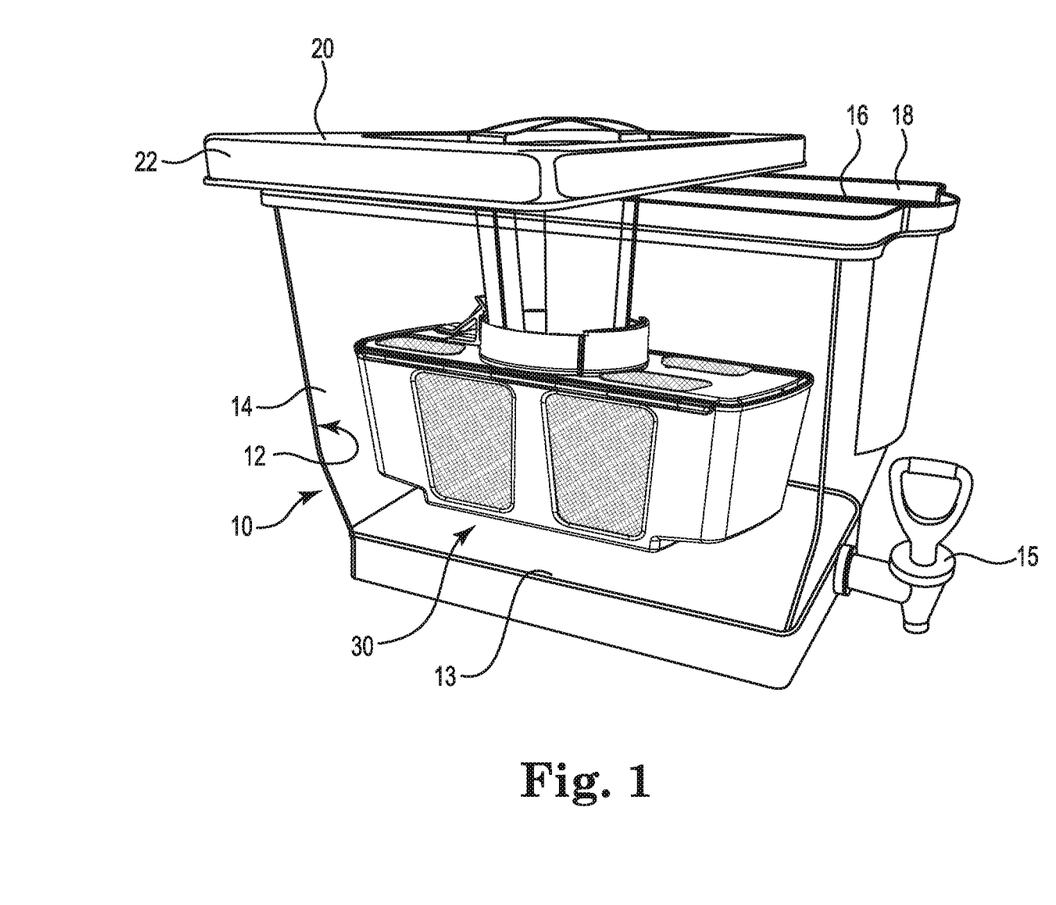
FIG. 1 shows a brewing or infusing apparatus in a fluid preparation state, in accordance with embodiments of the present invention.

As particularly illustrated in FIG. 1, the brewing, filtering or infusing apparatus 10 includes a selectively enclosable beverage dispenser 12 having a bottom 13 with upwardly extending walls 14 defining an interior 16 of the beverage dispenser 12. The walls 14 of the beverage dispenser 12 may terminate in a lip 18 that that can support a lid 20. The lid 20 may include a side wall 22 that extends downwardly to define an interior (not shown) of the lid 20. The side wall 22 of the lid 20 may be shaped to fit on or over the lip 18 of the beverage dispenser 12 in order to permit the lid 20 to cover the interior 16 of the beverage dispenser 12. The lid 20 may include a handle to permit a user to move the lid 20 onto and off of the beverage dispenser 12. A spout 15 may be operatively coupled to the beverage dispenser 12 to act as a conduit with the interior 16 to permit the dispensing of a brewed beverage.

Figure 2:
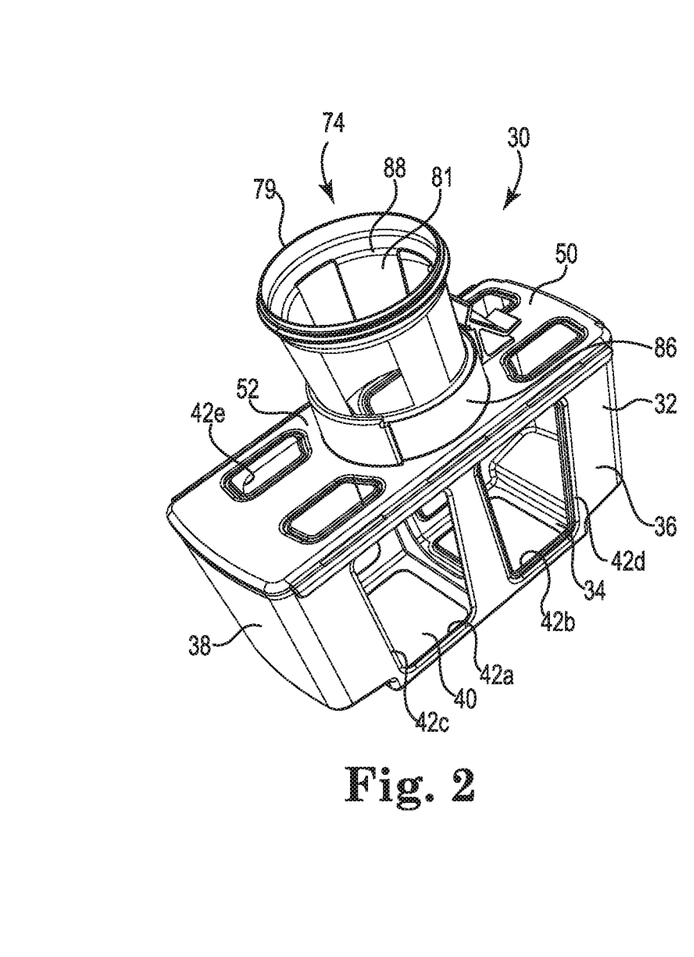
FIG. 2 is a perspective view of a basket assembly of the brewing apparatus, in accordance with embodiments of the present invention.
Figure 3:
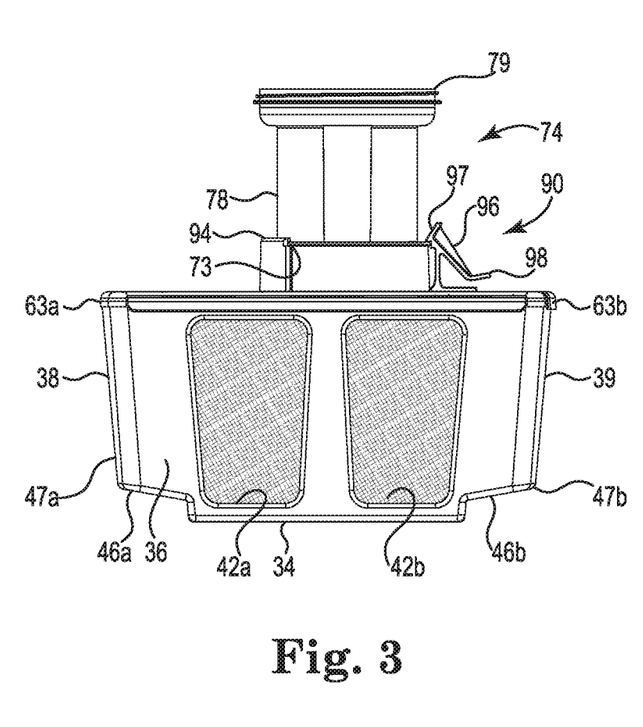
FIG. 3 is a side view of a basket assembly of the brewing apparatus, in accordance with embodiments of the present invention.
Figure 4:
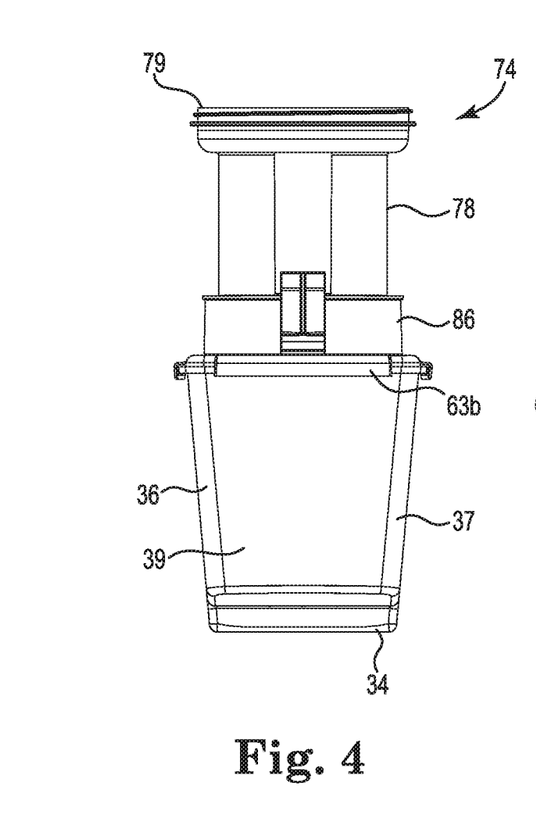
FIG. 4 is an end view of a basket assembly of the brewing apparatus, in accordance with embodiments of the present invention.

As also illustrated in FIG. 1, the brewing or infusing apparatus 10 also includes a brewing assembly 30 that is removably positionable in the interior 16 of the beverage dispenser 12. The beverage assembly 30 may comprise a brew basket 32 that is designed to hold material or infusible material used in the brewing or beverage making process. As illustrated in FIGS. 2-4, the brew or filter basket 32 may include a bottom or base wall 34, a pair of side walls 36 and 37, and a pair of end walls 38 and 39, all of which define an interior 40 for receiving the brewing or infusible material.

As particularly illustrated in FIG. 2 (shown without filter screens) and 3, the bottom wall 34 and the pair of side walls 36, 37 may include openings 42a-42f to permit a liquid such as water to flow into and out of the interior 40 of the brew basket 32 during the brewing process or during the cleaning process. The openings 42a-42f can be of any size, shape or configuration and the openings depicted should not be considered limiting.

As illustrated in FIGS. 1 and 6-8, to prevent the brewing or infusible material from escaping out of the interior 40 of the brew basket 32 during the brewing process, each of the openings 42a-42f may be covered with a porous material such as a screen or mesh 44. Any material may be used to cover the openings 42a-42f, provided it permits the liquid used in the brewing process to flow into and out of the interior 40 of the brew basket 32.

In an example embodiment of the invention, the bottom or base wall 34 of the brew basket 32 may include generally opposed base end wall portions or segments 46a and 46b that extend angularly up and away from the bottom wall 34 such that a thickness of the brew basket 32 generally increases from the pair of end walls 38, 39 toward a central or middle portion of the brew basket 32.

The angular or sloped orientation of the bottom wall 34 from the end walls 38 and 39 to the central portion defines opposed end drain portions 47a and 47b that permit fluid retained in the interior 40 of the brew basket 32 to drain or flow toward the central portion. In an example embodiment of the invention, the openings 42a and 42b extending through the central portion of the bottom or base wall 34 permit the liquid to escape from the brew basket 32, and as described later, to flow into the interior 16 of the beverage dispenser 12.

Figure 5:
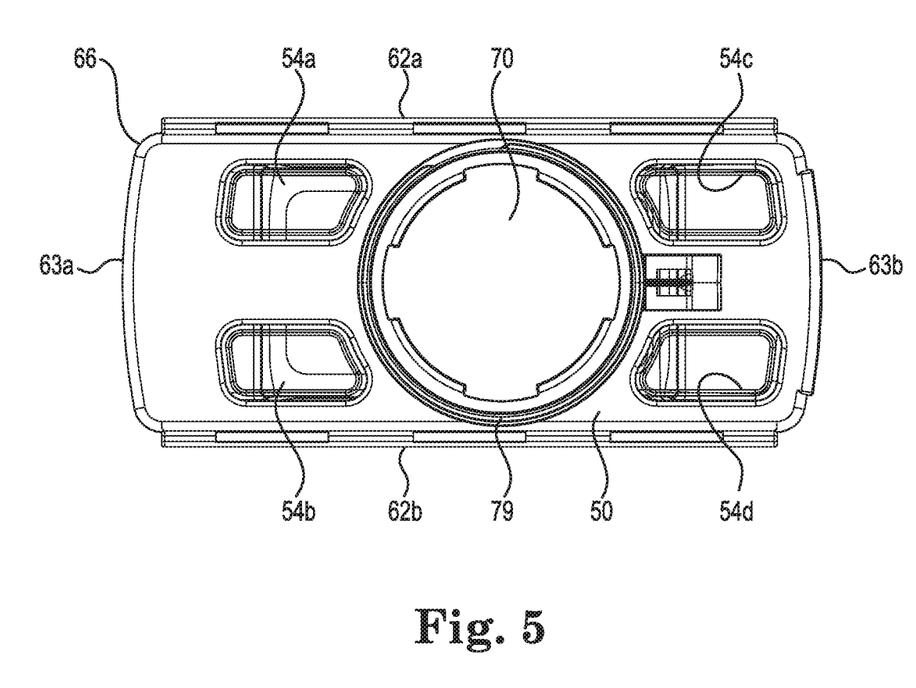
FIG. 5 is a top view of a basket assembly of the brewing apparatus, in accordance with embodiments of the present invention.

As illustrated in FIGS. 2 and 5 (shown without filter screens), a top or cover 50 may be removably coupled to the brew basket 32 to prevent the brewing or infusible material from escaping the interior 40 when the brew basket 32 is submerged in a liquid. The cover 50 has an upper or top surface 52 and a lower or bottom surface (not shown) with openings 54a-54d extending therethrough. Similar to the openings extending through the brew basket 32, a mesh, screen 56 or other straining means may be used to cover or extend across the openings 54a-54d to prevent the brew or infusible material from escaping the interior 40 of the brew basket 32.

In one example embodiment of the invention, the top or cover 50 of the brew basket 32 may be removably attached to the pair of side walls 36, 37 and the pair of end walls 38, 39 of the brew basket 32. To enable removable attachment to the brew basket 32, the top 50 may include a pair of downwardly extending side arms 62a, 62b and a pair of downwardly extending end arms 63a, 63b that are adapted to releasably engage a flange 66 or similar structure extending from the side walls 36, 37 and end walls 38, 39 of the brew basket 32.

In an example embodiment of the invention, the side arms 62a, 62b and the end arms 63a, 63b may pivot or bend with respect to the top 50 in order to engage the flange 66. In another example embodiment of the invention, the pivoting or flexing ability of the side arms 62a, 62b and end arms 63a, 63b is limited to at least one of the side arms 62a or 62b, or one of the end arms 63a or 63b such that the top 50 is capable of being slid onto the brew basket 32 with the non-flexing or pivoting side arms 62a, 62b and end arms 63a, 63b in sliding engagement with the flange 66. In this example embodiment, the at least one pivoting or flexing side arm or end arm is capable of releasably engaging the flange 66 to secure the top 50 to the brew basket 32. Other engagement orientations and arrangements are also contemplated herein and the above description should not be considered limiting.

As illustrated in FIG. 5, the top 50 may have an access opening 70 extending therethrough to permit a user to fill the brew basket 32 with brewing or infusible material. The access opening 70 may also be used to remove the brewing or infusible material after the brewing process. Alternatively, the top 50 may be removed to permit easier access to the interior 40 for removal of the brewing or infusible material and cleaning of the brew basket 32.

Figure 7:
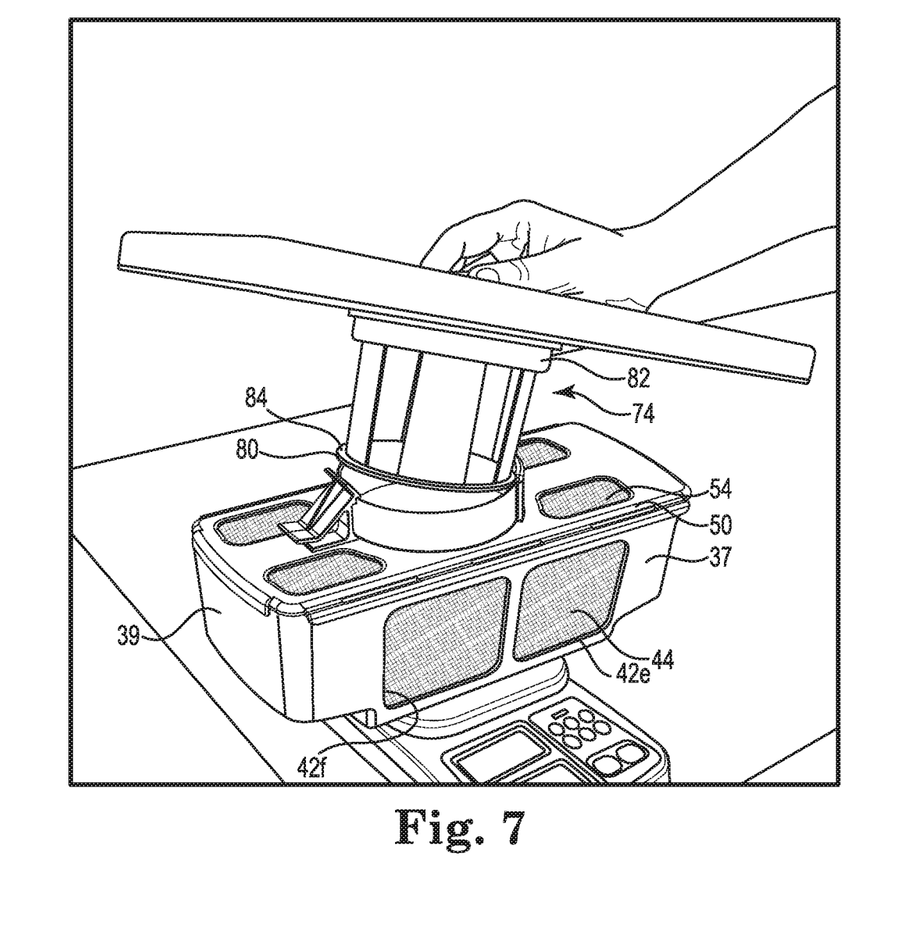
FIG. 7 shows a beverage dispensing lid having and a coupler being coupled to a brewing basket, in accordance with embodiments of the present invention.
Figure 8:
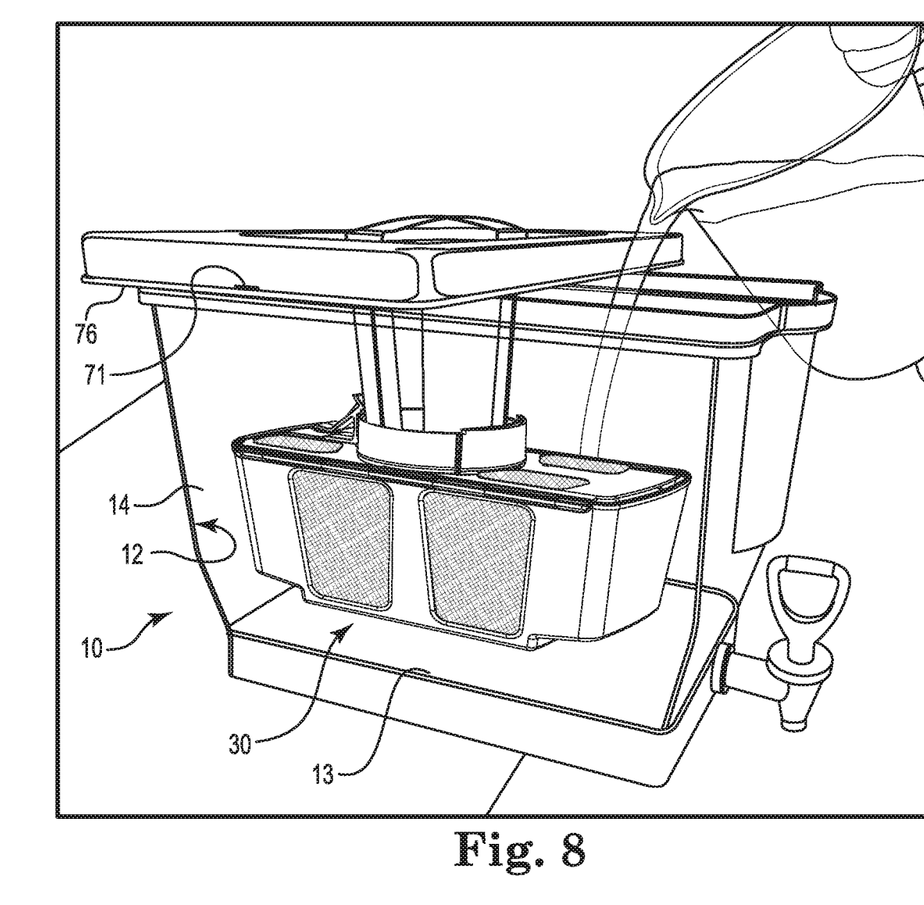
FIG. 8 shows a brewing basket positioned in a beverage dispenser that is being filled with water to start the brewing processes, in accordance with embodiments of the present invention.

As illustrated in FIGS. 1 and 8, the brew basket 32 may be removably suspended in a beverage dispenser 12 by a suspension assembly 74 (identified in FIG. 7). The suspension assembly 74 may include support member 76 that is capable of being disposed on a portion of the beverage dispenser 12. In one embodiment of the present invention, the support member 76 may have a generally planar shape and may be adaptable to be permanently or removably nested in or connectable to the lid 20 of the beverage dispenser 12. The support member 76 may have one or more tabs 77 extending from a surface thereof capable of engaging or connecting with a portion of the lid 20 to secure the support member 76 to the lid 20.

The support member 76 may also be directly connectable to the brew basket 32 such that the brew basket 32 may be placed in or removed from the interior 40 of the beverage dispenser 12 by lifting the support member 76 or, if coupled to the lid 20 of the beverage dispenser 12, by a user manipulating the lid 20.

The support member 76 may have any shape and configuration capable of supporting and suspending the brew basket 32 in the beverage dispenser 12. For example, the support member 76 may comprise a hook capable of extending over an edge of the beverage dispenser 12, a bar capable of extending across an opening of the beverage dispenser 12, or any other structure that supports the brew basket 32.

Figure 9:
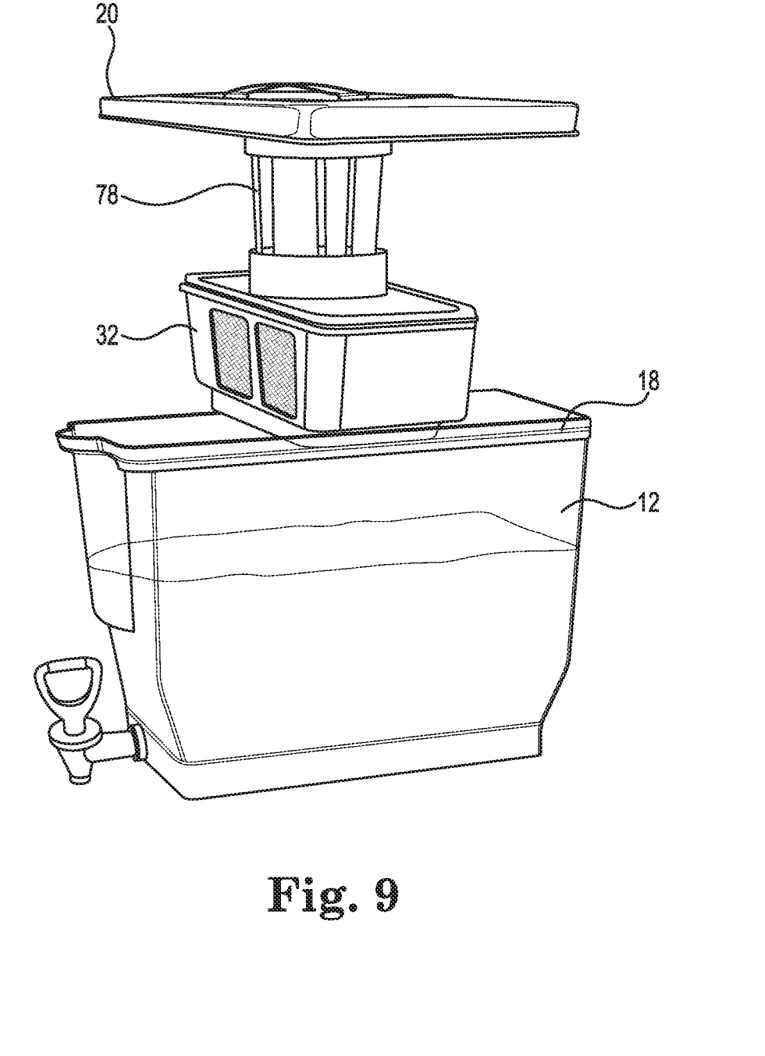
FIG. 9 shows a brewing basket positioned in a draining position, in accordance with embodiments of the present invention.
Figure 10:
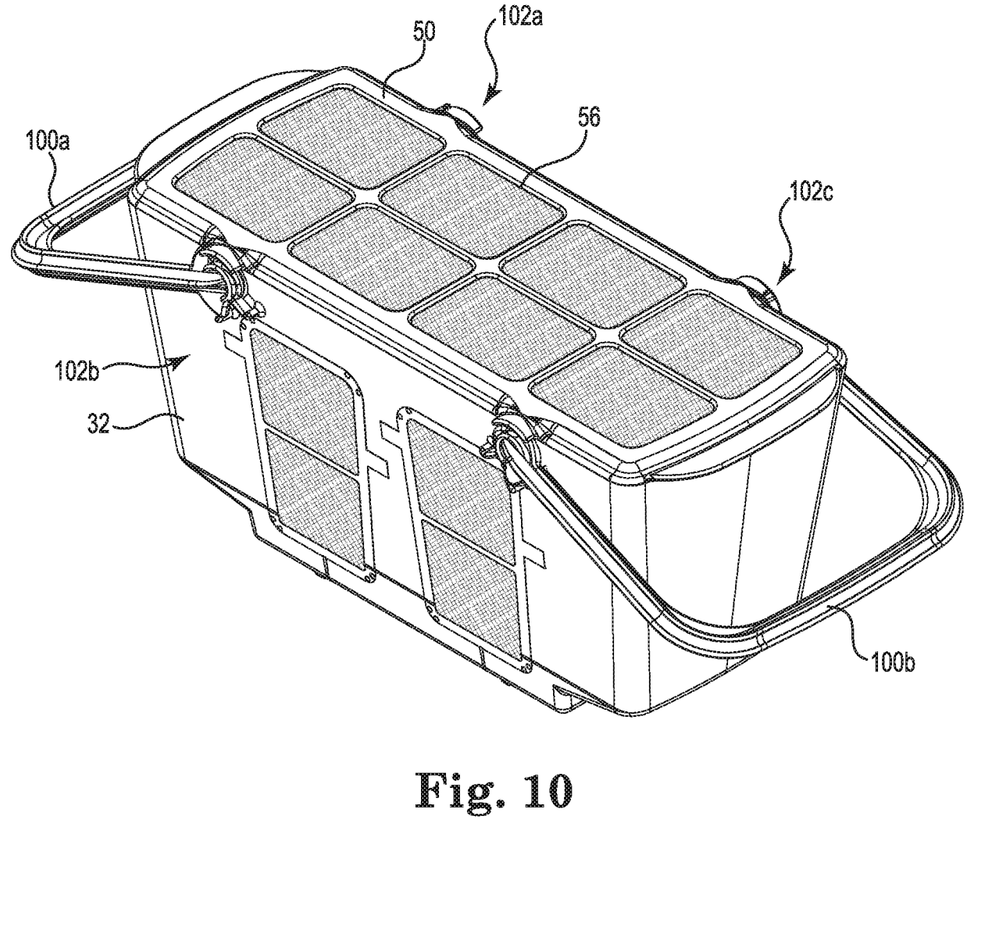
FIG. 10 is a perspective view of a brewing basket having handles, in accordance with embodiments of the present invention.

In another example embodiment, as illustrated in FIGS. 4 and 9, the suspension assembly 74 may include a coupler or spanning member 78 that extends between and couples the support member 76 to the brew basket 32. As illustrated in FIGS. 2-4 and 7, the coupler 78 may have a first end 79 that may be removably connectable to the support member 76. The coupler 78 may also have a second end 80 that may be removably connectable to the brew basket 32. Having a removable coupler 78 permits the suspension assembly 74 to be dismantled and more easily cleaned. Couplers 78 of varying lengths may be employed to enable the brew basket 32 to be used in beverage dispensers of varying depths.

In one example embodiment, the coupler 78 may include a side wall having one or more holes 81 extending therethrough to permit the flow and mixing of the brewing beverage to flow through the holes 81. The holes 81 may extend along a portion or an entire length of the coupler 78. The coupler 78 may also be solid or closed such that a liquid is prevented from entering an interior of the coupler 78.

In one example embodiment of the invention, the first end 79 of the coupler 78 may have a generally threaded inner or outer surface that may threadedly engage with a portion of the support member 76. For example, as illustrated in FIG. 7, the first end 79 of the coupler 78 may be threadedly coupled to a collar 82 extending from a lower surface of the support member 76. The collar 82 may have a threaded interior or exterior surface to threadedly mate with the threaded surface of the first end 79 of the coupler 78.

The second end 80 of the coupler 78 may have a lip, ring, shoulder, or similar structure 84 extending away from a surface of the coupler 78. The lip 84 of the coupler 78 may be removably positionable against or in contact with an annulus 86 extending in a generally upward direction from the top 50 of the brew basket 32. As particularly, illustrated in FIG. 5, the annulus 86 may be positioned around the access opening 70 of the top 50 such that an interior 88 of the coupler 78, if present, is in fluid communication with the interior 40 of the brew basket 32.

The second end 80 of the coupler 78 may be a solid structure or wall to act as a closure of the access opening 70 in the top 50 of the brew basket 32 when the coupler 78 is engaged with the annulus 86. In another example embodiment, the second end 80 of the coupler 78 may have a hole covered by a screen or mesh material to prevent the brewing material from escaping from the interior 40 of the brew basket 32 while permitting the beverage to flow up or down through the coupler 78 and top 50 of the brew basket 32.

As illustrated in the example embodiment of FIG. 3, the annulus 86 may include a clasp mechanism 90 attached to or formed therein that is capable of releasably clasping or connecting the lip 84 of the coupler 78 to the annulus 86. The clasp mechanism 90 may include groove 93 capable of receiving a portion of the lip 84 of the coupler 78. As particularly illustrated in FIG. 3, the groove 93 may be formed in a shoulder 94 rising generally above an edge of the annulus 86.

The clasp mechanism 90 may also include a clip or fastener 96 pivotally attached to or formed in a surface of the annulus 86. The fastener 96 may include a lip engaging portion 97 that is removably positionable over the lip 84 of the coupler 78 when it is disposed in or on the annulus 86. The fastener 96 may also include an actuating portion 98 for receiving a thumb or finger of a user. A user can operate or depress the actuating portion 98 to move the lip engaging portion 97 away from the annulus 86 and lip 84 of the coupler 78. The fastener 96 may move back toward the annulus 86 when a user ceases to depress the actuating portion 102.

In another example embodiment of the invention, the brew basket 32 may have one or more interior screened walls that partition the interior 40 into separate compartments. The separate compartments may be used to house different brewing materials for mixed brewed drinks. The compartments ensure complete brewing of the brew materials.

The brew basket 32 can be formed of glass, stainless steel, plastic or other material suitable to food preparation. The screen or mesh 44 can be stainless steel, or other suitable material for food preparation. The beverage dispenser 12 can be formed of glass, plastic, stainless steel or other suitable materials for food storage. The materials selected for the various components are preferably compatible with cleansing via high temperature washing machines. Combinations of various different materials can also be employed.

Figure 6:
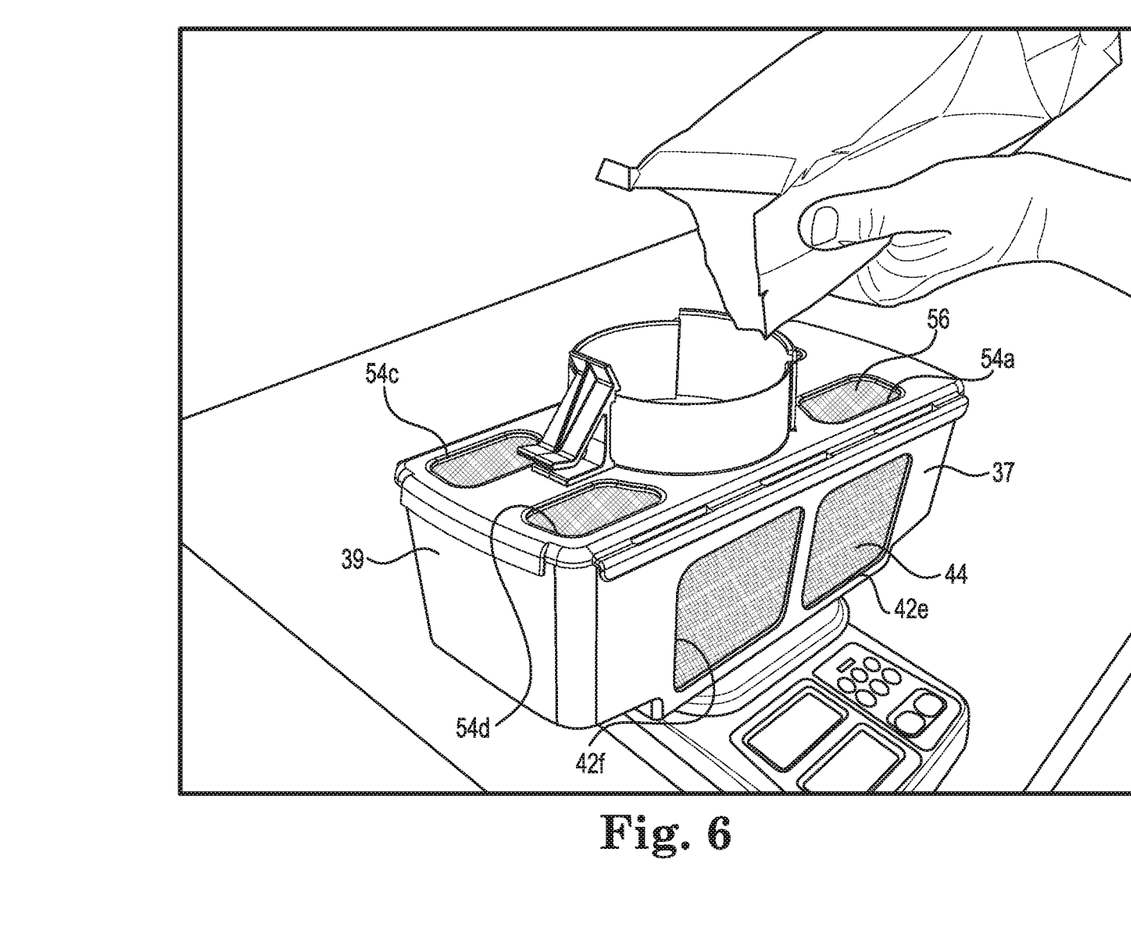
FIG. 6 shows the filling of a brewing basket with an infusible material such as coffee/tea, in accordance with embodiments of the present invention.

In use, and as illustrated in FIG. 6, a brewing material such as coffee grounds, tea or similar material may be placed into the interior 40 of the brew basket 32 by pouring or placing the brew material through the access opening 70 in the top 50 of the brew basket 32. A user may utilize a scale to place a predetermined amount of brewing material into the brew basket 32.

A user may then connect the coupler 78 to the support member 76 by attaching or threading it into or onto the collar 82. The lip 84 of the second end 80 of the coupler 78 may then be placed in the groove 93 of the annulus 86. To secure the coupler 78 to the brew basket 32, a user simply has to press or move a free side of the coupler 78 against the lip engaging portion 97 of the fastener 96. The coupler 78 will then move the lip engaging portion 97 away from the annulus 86. As the lip engaging portion 97 is moved away from the annulus 86, the lip 84 of the coupler 78 is permitted to engage the annulus 86. Once the lip 84 is seated against the annulus 86 the lip engaging portion 97 clips onto or secures the lip 84 to the annulus 86.

As illustrated in FIG. 1, once the brew basket 32 is coupled to the coupler 78 and the support member 76, the brew basket 32 may be lifted up and placed into the interior 16 of the beverage dispenser 12. Once placed in the beverage dispenser 12 the support member 76, or the support member 76 and lid 20 combination, may be rested across the lip 18 of the beverage dispenser 12 in what is called the "fill position". As illustrated in FIG. 8, the fill position permits a user to fill the beverage dispenser 12 with a liquid such as water. The liquid may be poured over the brew basket 32 to begin the brewing process.

When the beverage dispenser 12 is filled with the desired amount of liquid a user may rotate the support member 76, or the support member 76 and lid 20 combination, to close off the interior 16 of the beverage dispenser 12. As the support member 76, or the support member 76 and lid 20 combination, is rotated the coupler 78 may also freely rotate thereby permitting the brew basket 32 to remain in its position within the beverage dispenser 12.

As illustrated in FIG. 9, once the brewing process is completed, a user may lift the brew basket 32 out of the beverage dispenser 12 and place it in a "draining position" with respect to the beverage dispenser 12. In the draining position the removed brew basket 32 is rotated and placed on the lip 18 of the beverage dispenser 12. In this orientation, the bottom wall 34 end portions 46a and 46b rest on the lip 18 of the beverage dispenser 12 such that all the openings and particularly the openings 42a and 42b are positioned over the interior 16 of the beverage dispenser 22. The sloped angle or orientation of the end portions 46a and 46b drain the brewed beverage toward and out of the openings 42a and 42b and into the interior 16 of the beverage dispenser 12. The brew basket 32 may then be cleaned out and reused or cleaned for storage.

As illustrated in FIGS. 10-13, brew basket 32 may have a top or cover 50 that does not include a suspension assembly 74. In this particular embodiment, the brew basket 32 may be placed into the beverage dispenser 12 for brewing. The top 50 of the brew basket 32 may include additional openings extending therethrough with or without screens 56 to permit a liquid, such as water, to flow into and out of the brew basket 32.

The filter or brew basket 32 may include one or more support handles 100a and 100b that can be pivotally coupled to the basket 32 to permit a user to carry the brew basket 32 and/or to support the basket 32 in or on the beverage dispenser 12. The handles 100a and 100b can be used to carry the brew basket 32 and for lifting the brew basket 32 into and out of the beverage dispenser 12. The handles 100a and 100b may be manufactured from a similar or dissimilar material as the brew basket 32.

Figure 11:
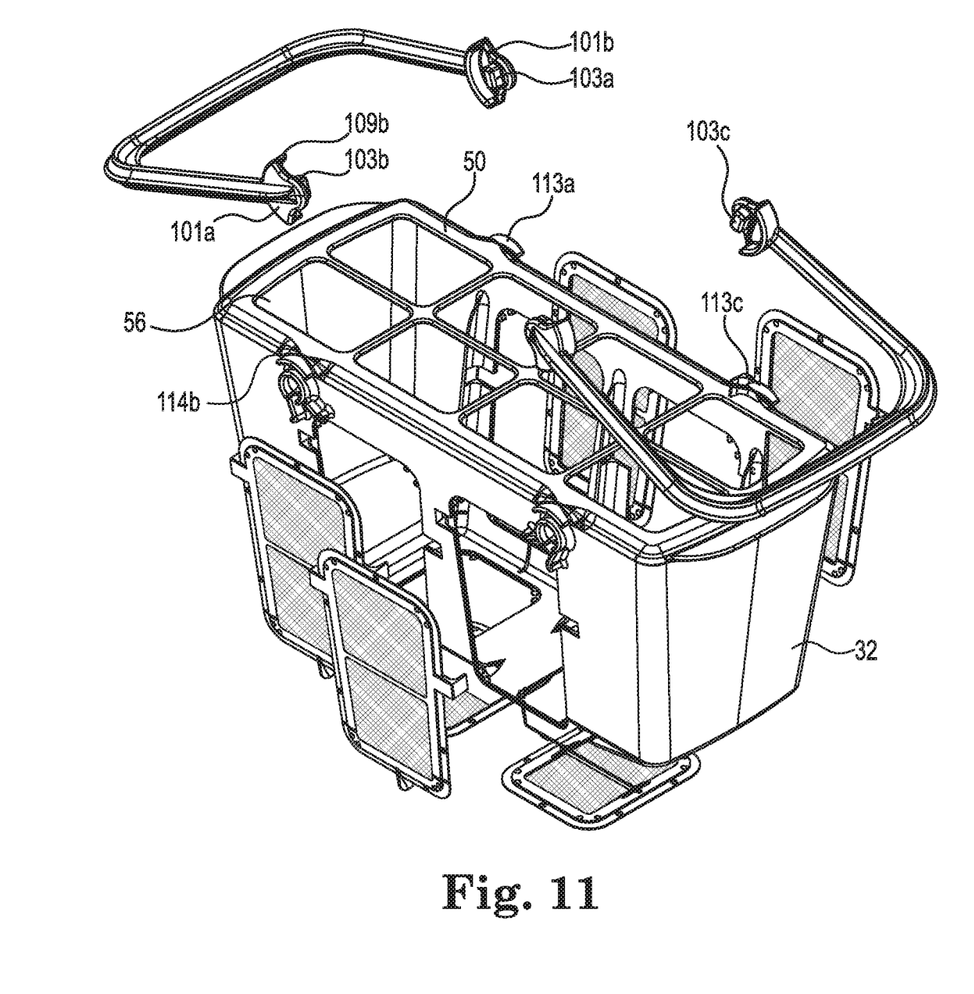
FIG. 11 is an exploded view of a brewing basket having handles, in accordance with embodiments of the present invention.
Figure 12:
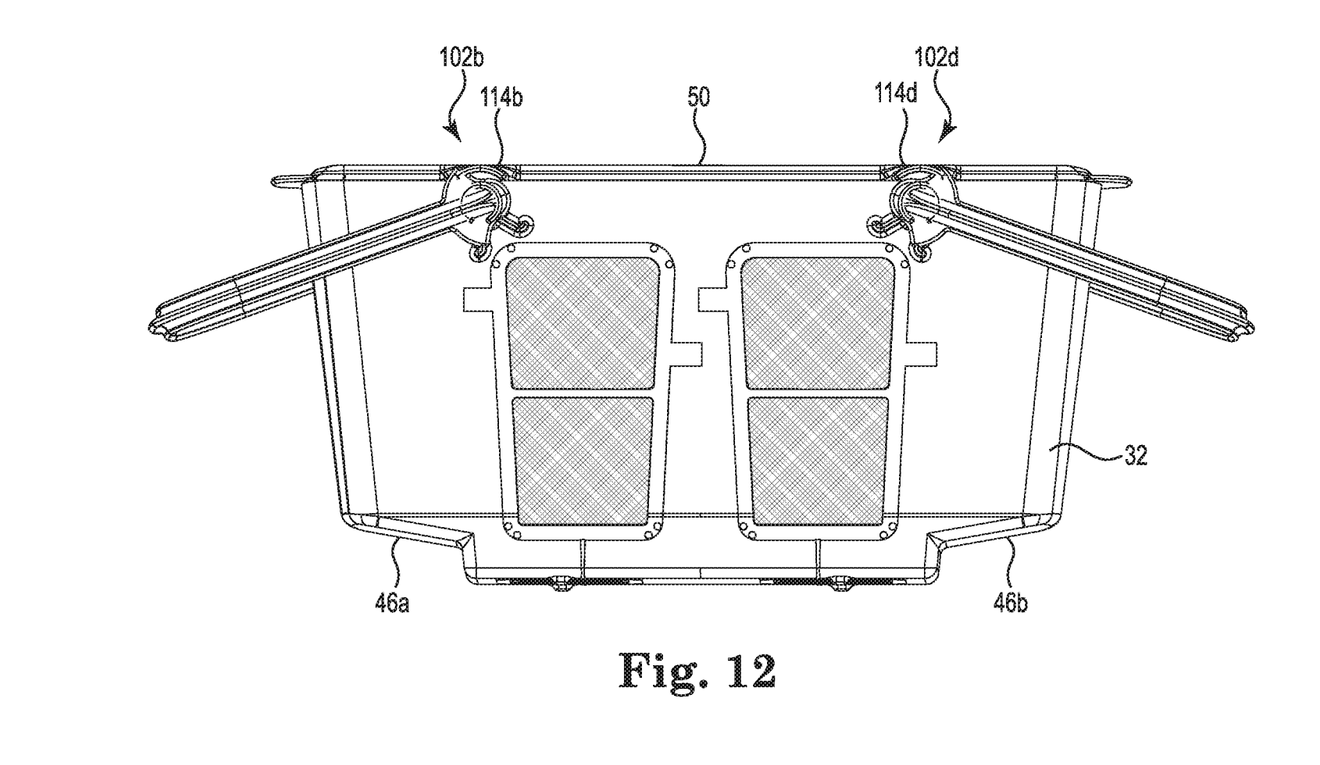
FIG. 12 is a side view of a brewing basket having handles, in accordance with embodiments of the present invention.
Figure 13:
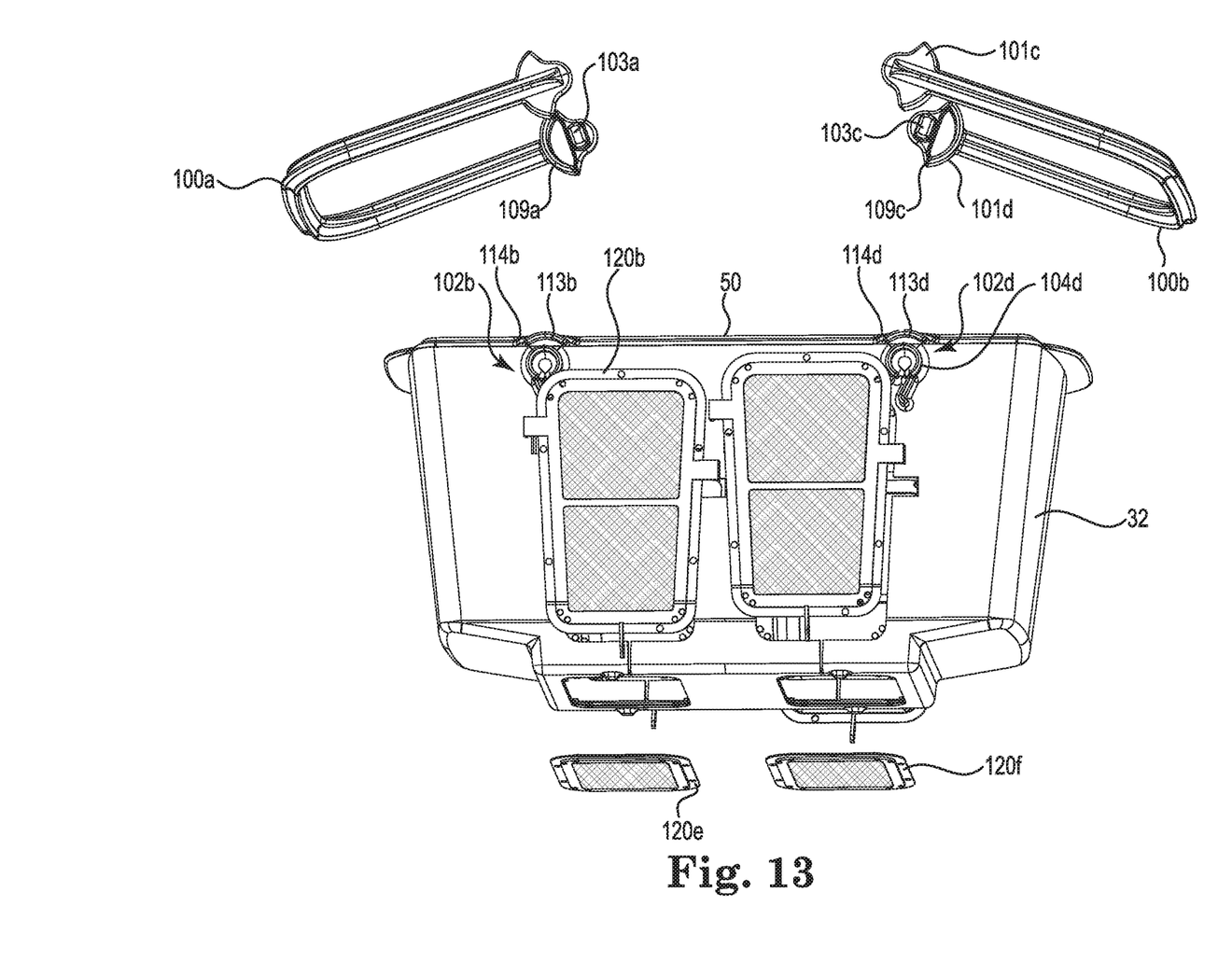
FIG. 13 is a side exploded view of a brewing basket having handles, in accordance with embodiments of the present invention.
Figure 15:
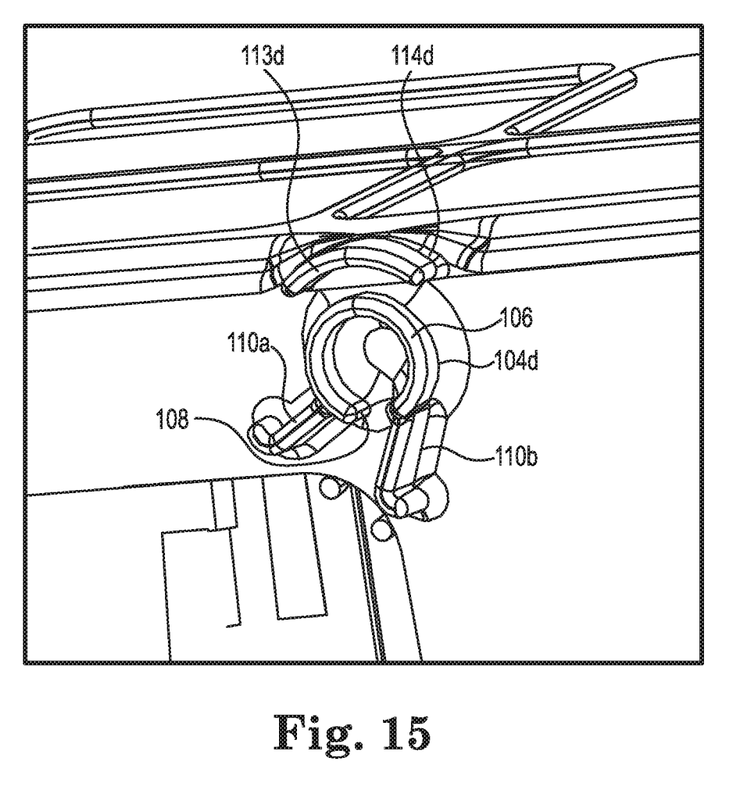
FIG. 15 is a perspective view of a socket capable of receiving a handle, in accordance with embodiments of the present invention.

In one example embodiment of the invention, each of the handles 100a and 100b, have one or more free ends 101a, 101b, 101c, and 101d that are pivotally coupled to the brew basket 32. As illustrated in FIGS. 11, 13, and 15, each free end 101a, 101b, 101c, and 101d of the handles 100a and 100b have a protuberance or boss 103a-103c that is capable of being pivotally fixed or removable from a portion of the brew basket 32. In one example embodiment, the bosses 103a-103c may be rotatably positioned in a hole or channel formed in the brew basket 32.

In example embodiment, each of the handles 100a and 100b have a latch mechanism 102a-102d for releasably securing the top 50 to the brew basket 32. As illustrated in FIG. 15, each latch mechanism 102a-102d includes socket 104a-104d formed by a semi-circular wall 106 extending away from an outer surface of the brew basket 32. Each semi-circular wall 106 includes a channel 108 formed therein for permitting movement of a respective boss 103a-103c into and out of a respective socket 104a-104d.

Figure 16:
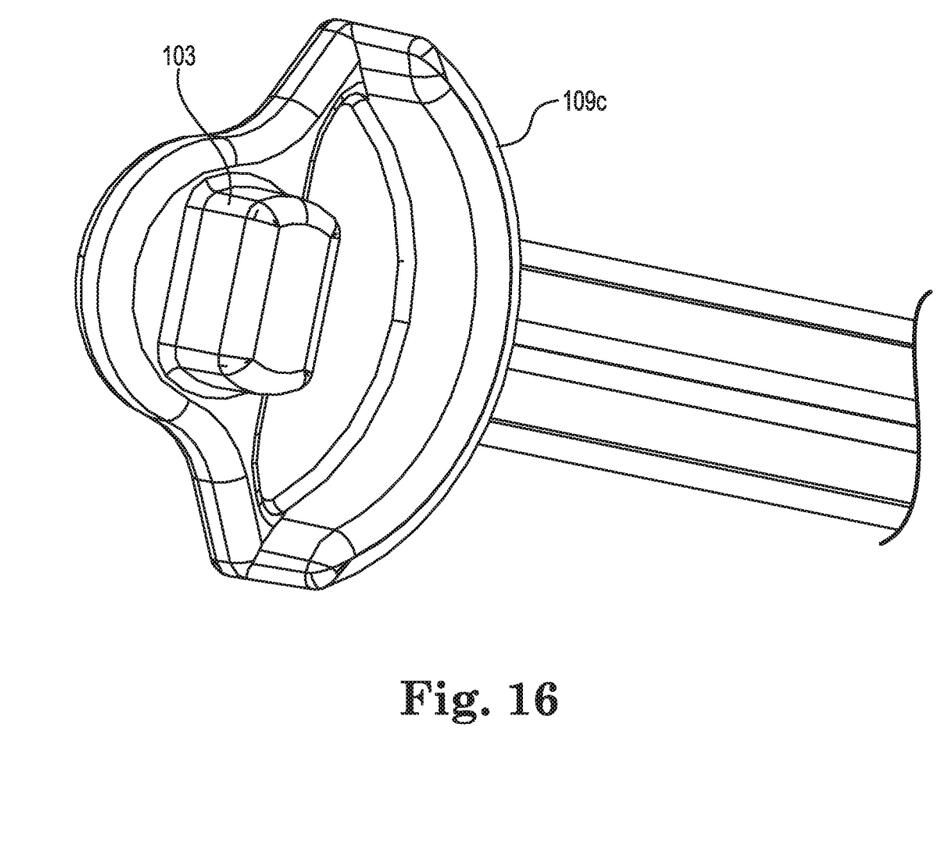
FIG. 16 is a perspective view of a free end of a handle having a boss capable of being inserted into a socket of the brewing basket.

As particularly illustrated in the example of FIG. 16, each free end 101a, 101b, 101c, and 101d of the handles 100a and 100b include a catch 109a-109c spaced a distance from a boss 103a-103c. The catches 109a-109d extend generally away from the handle 100a and 110b such that as the handles 100a and 100b are rotated the catches 109a-109d rotate over a portion of the top 50 pressing it onto the brew basket 32 and preventing its movement.

Rotatable movement of the handles 100a and 100b within the sockets 104a-104d may be restricted or limited by a first stop 110a and a second stop 110b formed proximate to the circular wall 106 of each socket 104a-104d. Each stop 110a and 110b may be formed by a generally curved wall extending generally away from the semi-circular wall 106 of each socket 104a-104c. As a handle 100a or 100b is moved over the brew basket 32 catches 109a-109d engage the top 50 and an end of the catch abuts the first stop 110a of respective sockets 104a-104d. As a handle 100a or 100b is moved toward the ends of the brew basket 32 catches 109a-109d disengage the top 50 and an end of the catches abut the second stop 110b of respective sockets 104a-104d.

As illustrated in FIGS. 11 (shown without filter screens) and 15, the top 50 includes securement portions 113a-113d that receive catches 109a-109c. The securement portions 113a-113d may have a shape (such as curved) that is generally the same as the shape of the catches 109a-109d. The top 50 has groove 114a-114d formed therein to permit the catches 109a-109d to travel over the securement portions 113a-113d.

Figure 14:
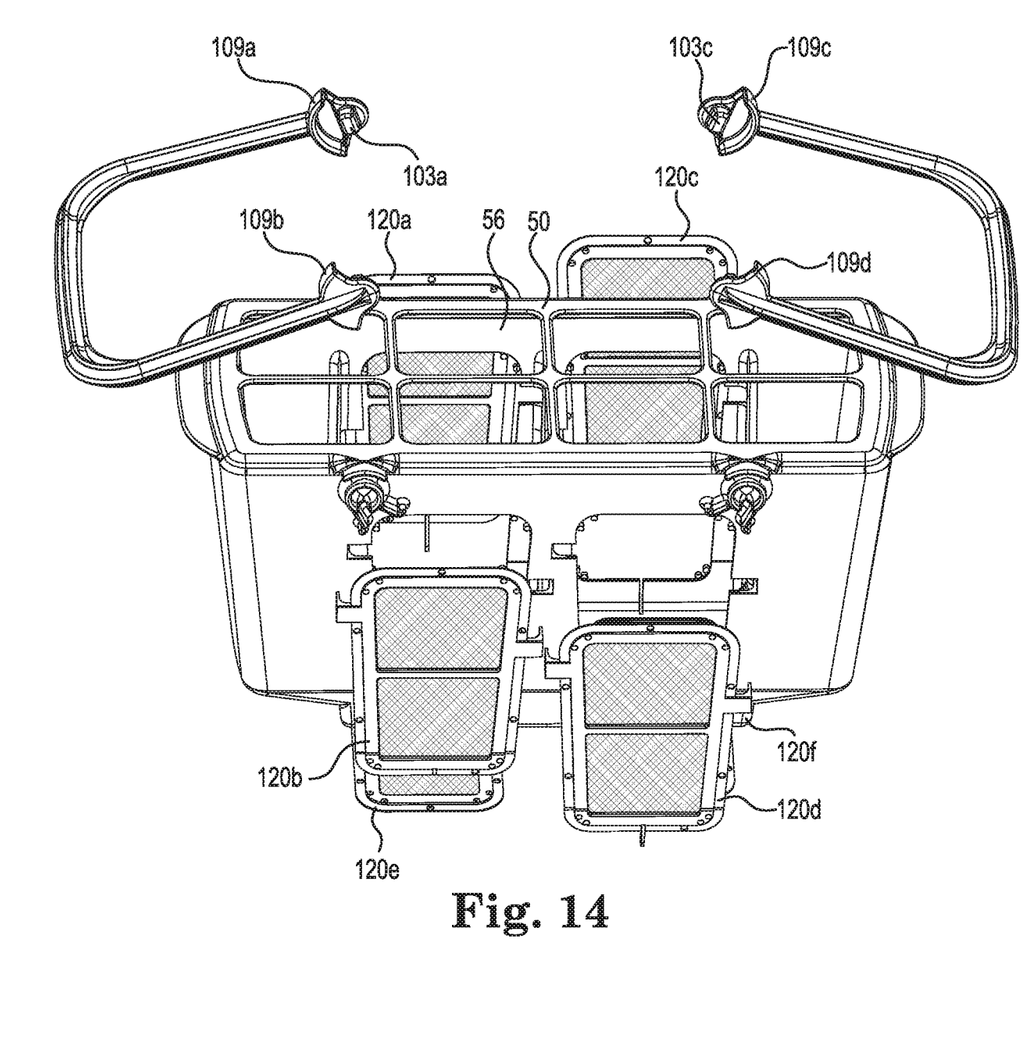
FIG. 14 is a perspective exploded view of a brewing basket having handles, in accordance with embodiments of the present invention.

As particularly illustrated in FIG. 14 (shown without filter screens), screens 56 may be attached to frames 120a-120f that are removably positionable in the brew basket 32 and/or top 50 (shown without screens for illustrative purposes). The frames 120a-120f permit a user to replace screens 56 that may become clogged or damaged. The frames 120a-12f may be removably coupled to the brew basket 32 or top 50 by clips, fasteners, or pressure fit. In one embodiment, frames 120a-120f may have arms or clip arms that are removably positioned in a recess of the side wall or bottom wall of the basket 32.

While the invention has been described in connection with what is presently considered to be the most practical and preferred embodiments, it will be apparent to those of ordinary skill in the art that the invention is not to be limited to the disclosed embodiments. It will be readily apparent to those of ordinary skill in the art that many modifications and equivalent arrangements can be made thereof without departing from the spirit and scope of the present disclosure, such scope to be accorded the broadest interpretation of the appended claims so as to encompass all equivalent structures and products. Moreover, features or aspects of various example embodiments may be mixed and matched (even if such combination is not explicitly described herein) without departing from the scope of the invention.

For purposes of interpreting the claims for the present invention, it is expressly intended that the provisions of 35 U.S.C. § 112(f) are not to be invoked unless the specific terms "means for" or "step for" are recited in a claim.

What is claimed is:

1. A filter assembly for holding an infusible material, the filter assembly being at least partially submergible into a liquid to make a beverage, the filter assembly comprising:
    a basket having a bottom wall, a front wall, a back wall and a pair of planar side walls extending between the front wall and the back wall, and the pair of planar side walls extending upwardly from the bottom wall, the front wall, the back wall and the pair of planar side walls forming an open top and an interior of the basket for holding the infusible material;
    a cover detachable over the open top of the basket to enclose the interior;
    at least one removable filter screen assembly disposed in at least one of the pair of planar side walls of the basket; and
    a handle pivotally coupled to one of the planar side walls of the basket at a first end of the handle, the handle comprising a latch at the first end that is configured to secure the cover against the open top of the basket via a pivoting motion of the handle.

2. The filter assembly of claim 1, wherein the filter screen assembly comprises a frame and a screen disposed on the frame.

3. The filter assembly of claim 2, wherein the frame includes at least one clip arm extending outwardly from the frame to engage a corresponding recess defined in at least a portion of one of the side walls of the basket.

4. The filter assembly of claim 1, wherein the cover includes at least one filter screen capable of permitting passage of a liquid through the cover.

5. The filter assembly of claim 1, wherein the bottom wall of the basket has generally opposed angularly extending end wall segments defining bottoms of opposed end drain portions of the basket.

6. The filter assembly of claim 5, wherein the opposed end drain portions of the basket are non-porous.

7. The filter assembly of claim 1, wherein the handle defines a second end that is pivotally coupled to the basket on a sidewall opposite where the first end is pivotally coupled to the basket.

8. A filter assembly for holding an infusible material, the filter assembly comprising:
    a basket having a bottom wall, a first sidewall extending upwardly from the bottom wall, a second sidewall opposite the first sidewall and extending upwardly from the bottom wall, a third sidewall that is planar and spans horizontally between the first sidewall and the second sidewall and upwardly from the bottom wall, and a fourth sidewall opposite the third sidewall that is planar and spans horizontally between the first sidewall and the second sidewall and upwardly from the bottom wall, wherein the bottom wall, first sidewall, second sidewall, third sidewall and fourth sidewall together define an open interior that can hold the infusible material;
    a cover detachable to the basket to enclose the interior; and
    a plurality of removable filter screen assemblies, wherein at least one removable filter screen assembly is disposed in each respective one of the cover, the bottom wall, the first sidewall and the second sidewall.

9. The filter assembly of claim 8, further comprising a handle pivotally coupled to a portion of the basket, the handle comprising a latch that is configured to secure the cover against the basket via a pivoting motion of the handle.

10. The filter assembly of claim 9, wherein the handle defines a first end and an opposing second end, each of the first and second ends being pivotally coupled to the basket on a respective one of the first sidewall and the second sidewall.

11. The filter assembly of claim 8, wherein the top cover is planar.

12. The filter assembly of claim 11, wherein the first sidewall and the second sidewall are both planar for a majority of a surface area thereof.

13. The filter assembly of claim 8, wherein the first sidewall and the second sidewall are both planar for a majority of a surface area thereof.

14. The filter assembly of claim 8, wherein the bottom wall of the basket comprises a pair of opposed angularly extending end wall segments defining bottoms of opposed end drain portions of the basket.

15. The filter assembly of claim 14, wherein the opposed end drain portions of the basket are non-porous.

16. The filter assembly of claim 8, wherein each of the plurality of filter screen assemblies comprises a frame and a screen disposed on the frame.

17. The filter assembly of claim 16, wherein the frame of the filter assemblies disposed in each of the first sidewall and the second sidewall includes at least one clip arm extending laterally outwardly from the frame to engage a corresponding recess defined in a respective portion of the first sidewall and second sidewall adjacent to where the filter screen assembly is located.

18. The filter assembly of claim 8, wherein there are no filter screen assemblies disposed in the first sidewall and the second sidewall.

* * * * *